United States Patent [19]

Lomas et al.

[11] Patent Number: 4,833,933

[45] Date of Patent: May 30, 1989

[54] ALTERNATE PATH TRACTOR TRANSMISSION HAVING A REDUNDANT CLUTCH

[75] Inventors: William F. Lomas, Troy; William Margolin, Southfield; Robert F. Moglia, Bloomfield Hills, all of Mich.

[73] Assignee: Ford New Holland, Inc., New Holland, Pa.

[21] Appl. No.: 64,960

[22] Filed: Jun. 22, 1987

[51] Int. Cl.⁴ .............................. F16H 3/08
[52] U.S. Cl. ........................ 74/359; 74/330; 74/360
[58] Field of Search ............ 74/359, 330, 334, 339, 74/325, 745, 360

[56] References Cited

U.S. PATENT DOCUMENTS

| | | | |
|---|---|---|---|
| 1,775,460 | 9/1930 | Herrmann | 74/357 |
| 2,231,966 | 2/1941 | Swennes | 74/745 |
| 2,567,042 | 9/1951 | Wemp | 74/330 |
| 2,648,992 | 8/1953 | Vincent | 74/330 |
| 2,857,772 | 10/1958 | Garnier et al. | 74/359 |
| 2,880,833 | 4/1959 | Stevenson et al. | 74/330 |
| 2,939,328 | 6/1960 | Sinclair | 74/339 |
| 2,949,047 | 8/1960 | Burckhardt | 74/732 |
| 3,106,273 | 10/1963 | Doerfer et al. | 74/360 |
| 3,164,232 | 1/1965 | General | 74/330 |
| 3,362,245 | 1/1968 | Francuch et al. | 74/359 |
| 3,691,861 | 9/1972 | Sturmer | 74/330 |
| 3,741,035 | 6/1973 | May | 74/745 |
| 3,769,857 | 11/1973 | Whateley | 74/359 X |
| 3,783,985 | 1/1974 | May | 74/745 X |
| 3,802,293 | 4/1974 | Winckler et al. | 74/745 |
| 3,859,870 | 1/1975 | Whateley | 74/360 |
| 3,893,345 | 7/1975 | Sisson et al. | 74/359 X |
| 3,897,699 | 8/1975 | Hoyer | 74/360 X |
| 3,906,817 | 8/1975 | Kreitzberg | 74/740 |
| 3,916,712 | 11/1975 | Kelbel et al. | 74/325 |
| 3,991,634 | 11/1976 | Longshore | 74/745 |
| 4,132,133 | 1/1979 | Ballendux | 74/745 |
| 4,136,575 | 1/1979 | Labat | 74/359 |
| 4,271,715 | 6/1981 | Arai | 74/359 X |
| 4,282,775 | 8/1981 | Van Dest | 74/360 X |
| 4,318,305 | 3/1982 | Wetrich et al. | 74/359 |
| 4,398,432 | 8/1983 | Quick | 74/360 X |
| 4,483,210 | 11/1984 | Mayuzumi | 74/745 |
| 4,628,768 | 12/1986 | Omura et al. | 74/745 |
| 4,658,663 | 4/1987 | Hiraiwa | 74/359 |
| 4,674,347 | 6/1987 | Nishida et al. | 74/359 |
| 4,674,358 | 6/1987 | Nishimura | 74/360 |
| 4,686,869 | 8/1987 | Beim | 74/360 X |

FOREIGN PATENT DOCUMENTS 2036208 6/1980 United Kingdom .............. 74/359

Primary Examiner—Dirk Wright
Attorney, Agent, or Firm—Frank G. McKenzie; Donald J. Harrington

[57] ABSTRACT

A tractor transmission includes first and second hydraulically actuated disc clutches adapted to drivably connect an input shaft, which is clutched by a friction clutch to an engine, to a first and second sleeve shafts. The countershaft and the sleeve shafts support gear-pinion pairs that produce four speed ratios. The range box includes gearing mounted on an output shaft, a countershaft, and the input shaft to drive the output shaft at a slower speed than that of the countershaft when the low range is selected, to drive the output shaft in the opposite direction to its forward drive direction when reverse operation is selected, and to directly connect the countershaft to the output shaft when the high speed range is selected.

21 Claims, 2 Drawing Sheets

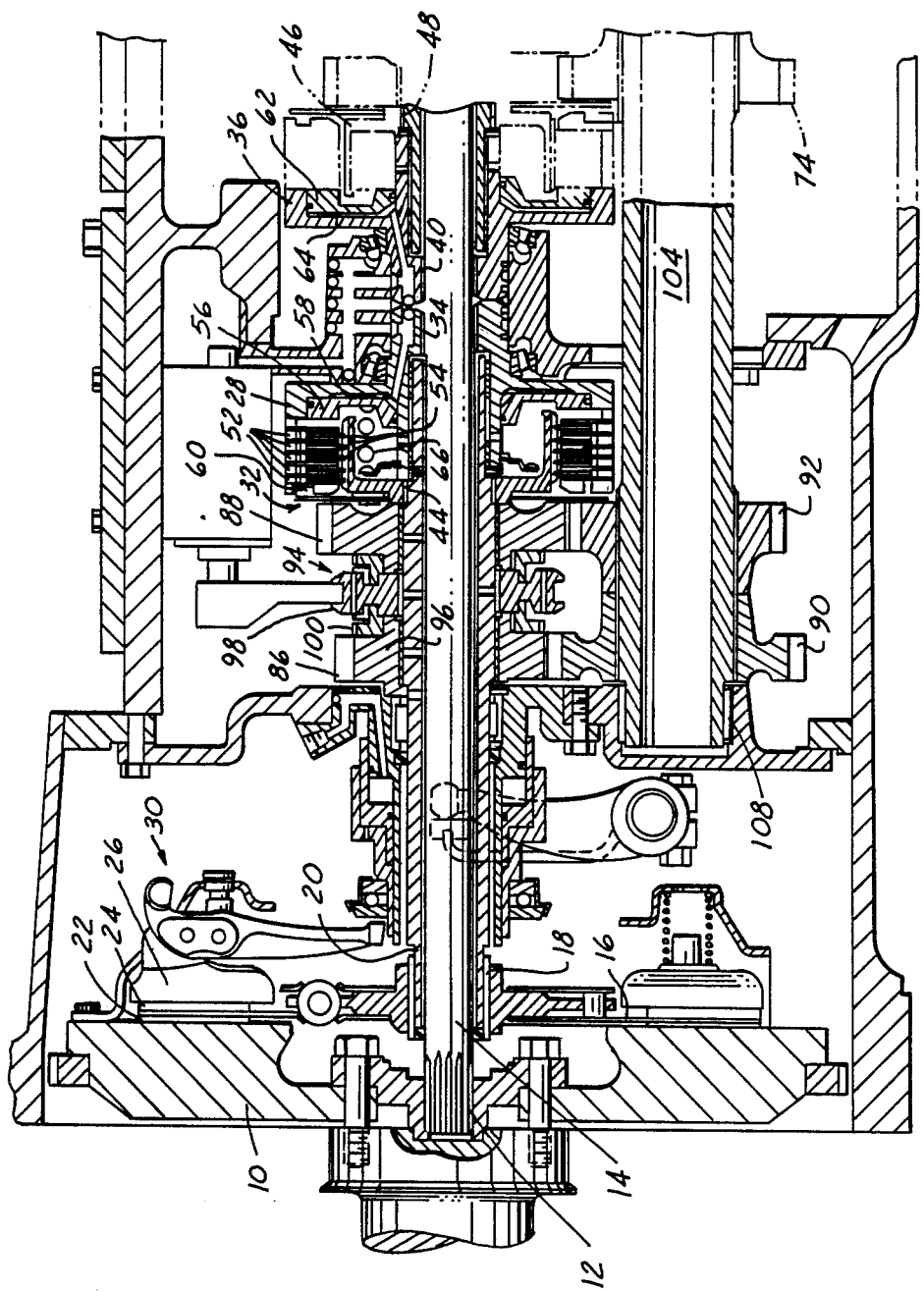

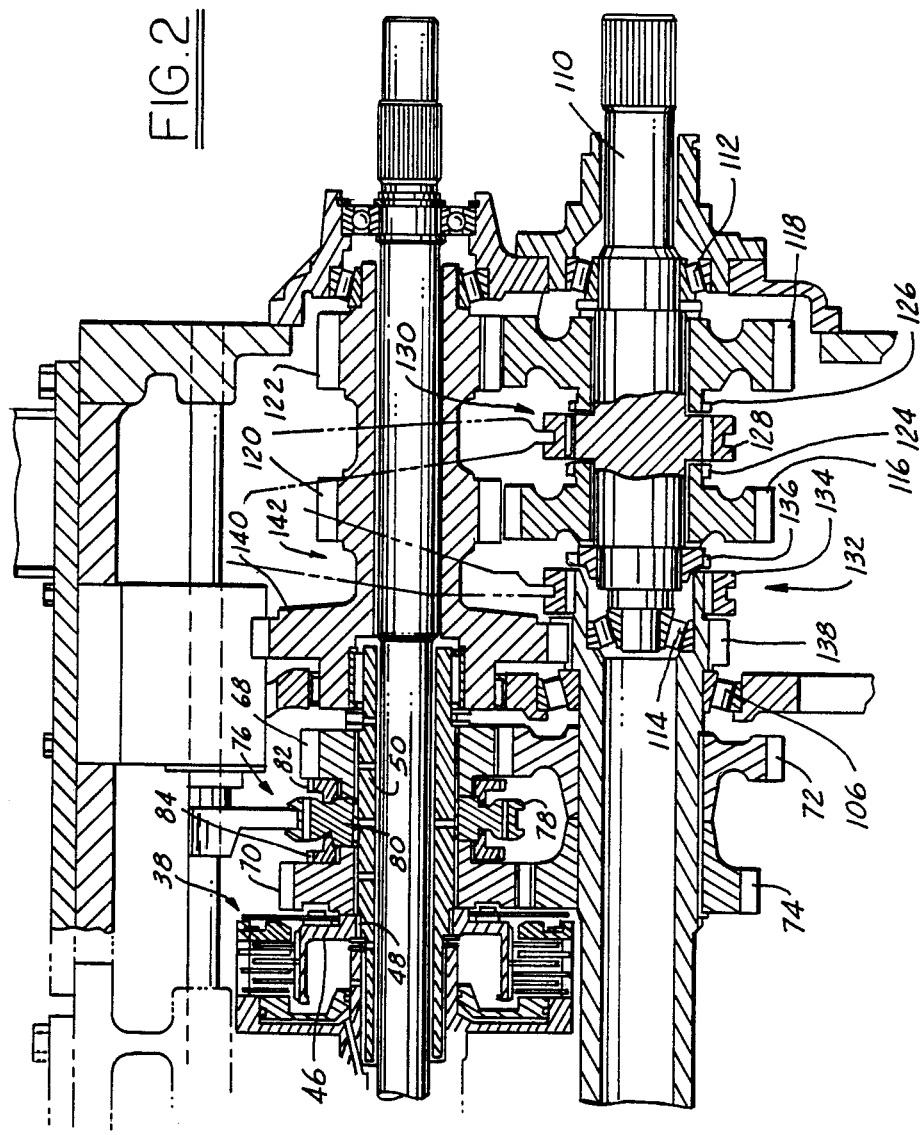

ALTERNATE PATH TRACTOR TRANSMISSION HAVING A REDUNDANT CLUTCH

BACKGROUND OF THE INVENTION

1. Field of the Invention

This invention relates to the field of synchronized shifting among various speed ratios of a multiple speed tractor transmission. More particularly, the invention pertains to accelerating a tractor load at very low speed through operation of a dry friction clutch.

2. Description of the Prior Art

Tractor gear boxes produce a large number of gear ratios within a transmission mechanism located between the engine and the final drive differential mechanism. In the conventional design, a first gear arrangement produces a range of speed reduction of the output of a first gear set in relation to the speed of the engine. Typically, the torque delivery path of such a transmission includes a creeper speed mechanism located behind the first gear set and before the differential mechanism. The range speed mechanism produces an additional speed reduction between the output of the transmission gear set and the output of the range speed mechanism.

In the operation of a conventional tractor transmission, the vehicle accelerates the load from stop as the vehicle operator shifts the transmission from the lowest gear ratios to the higher gear ratios. His control of the speed of the vehicle for a given engine speed must therefore change in accordance with the predetermined gear ratio of the transmission gear set and range speed mechanism.

However, it would be preferable, especially at the lowest vehicle speeds, if the operator were able to control manually the speed and rate of acceleration of the vehicle over a continuous, stepless speed range determined by the operator in accordance with the requirements of the work being performed. Thereafter, when the speed of the vehicle has been increased sufficiently, the vehicle operator could discontinue manuel speed control and return control of the vehicle speed to the predetermined ratios of the transmission gear set and range speed mechanism.

SUMMARY OF THE INVENTION

In realizing these objectives, the transmission according to the present invention includes a friction clutch adapted for connection to an internal combustion engine or other power source and located in the driveline between a flywheel and a first shaft that transmits power to a gear set adapted to produce the multiple gear ratios of the transmission. A hydraulically actuated clutch has its input member continuously connected by an input shaft to the engine and flywheel and has its output shaft connected to the first shaft, as is the output of the friction clutch.

A second hydraulic clutch has its input continuously connected to the engine by an input shaft and has its output connected to a second shaft that delivers power to a second gear set capable of producing multiple gear ratios.

The gear set associated with the first hydraulic clutch produces even-numbered gear ratios; the gear set associated with the second hydraulic clutch produces odd-numbered gear ratios. Synchronizer clutches drivably connect the gears of the first and second gear sets corresponding to the selected gear ratio to the shaft on which the gears are journalled. As the transmission is upshifted through the range of gear ratios, the synchronizer clutch associated with the next highest gear ratio is moved to engage the corresponding gear while the transmission is operating in the adjacent lower gear ratio and while the other synchronizer clutch is engaged with the gear corresponding to the currently selected gear ratio. Therefore, when an upshift is made, the synchronizers are maintained in the current and preselected positions and the gear shift is made by disengaging the hydraulic clutch associated with the current gear ratio and engaging the other hydraulic clutch.

The vehicle operator manually controls a linkage, which operates the friction clutch accordingly to transmit power from the engine through the friction clutch to one of the shafts driven by one of the hydraulic clutches. In this way, through operation of the linkage, and without engaging either of the hydraulic clutches, the vehicle operator can determine the speed of the input to the gear set that corresponds to the selected gear ratio, thereby controlling the slip across the friction clutch and establishing manually the speed of the vehicle.

BRIEF DESCRIPTION OF THE DRAWINGS

FIGS. 1 and 2 show the arrangement of the clutches, synchronizers, transmission gear set and range speed mechanism according to this invention.

DESCRIPTION OF THE PREFERRED EMBODIMENT

The crankshaft of an engine carries a flywheel 10, which is connected at a spline 12 to the input shaft 14 of a tractor transmission. The disc 16 of a dry friction clutch is fixed by spline 18 to a first sleeve shaft 20, which is concentric with the input shaft and rotates between a friction surface 22, carried on the inside face of the flywheel, and a friction surface 24, carried on the adjacent face of the pressure plate 26 of the clutch. A linkage shown generally at 30 functions under the control of the operator to force pressure plate 26 and friction surfaces 22, 24 into engagement with disc 16, thereby drivably connecting shaft 20 through the friction clutch to the engine.

The input member 28 of a first hydraulic clutch 32 is splined at 34 to input shaft 14, and the input member 36 of a second hydraulic clutch 38 is connected at spline 40 to the input shaft 14. The output member of the first clutch 32 is connected at spline 44 to sleeve shaft 20, and the output member 46 of the second clutch is splined at 48 to a second sleeve shaft 50, rotatably mounted coaxially with shafts 14 and 20.

Clutch plates 52 are fixed to input member 28, and a second set of output clutch plates 54, fixed to the output member 42, is located between clutch plates 52. A piston 56 moves within a clutch cylinder 58 according to the pressurized and vented state of the cylinder. When the cylinder is pressurized, the piston forces clutch plates 52 and 54 into frictional driving contact and against the pressure plate 60, whereby input shaft 14 is drivably connected to sleeve shaft 20. The second hydraulic clutch 38 is similarly arranged and produces a drivably connection between input shaft 14 and sleeve shaft 50 when piston 62 forces the clutch plates into driving frictional engagement as clutch cylinder 64 is pressurized. When the clutch cylinders are vented, a return spring, such as spring 66, forces the respective pistons out of contact with the clutch plates, thereby disengaging input shaft 14 from the associated sleeve shaft 20 or 50.

A second gearing arrangement including a first speed ratio pinion 68 and a third speed ratio pinion 70 are journalled on the outer surface of the shaft 50 and are in continuous meshing engagement, respectively, with a first speed ratio gear 72 and a third speed ratio gear 74. Located between these pinions and drivably fixed to sleeve shaft 50, is a second synchronizer clutch 76 having a sleeve 78 mounted within the spline on the outer surface of the hub 80 of the synchronizer for movement into engagement with dog teeth 82, 84, connected respectively to pinions 68 and 70. When sleeve 78 is moved rearward to engage teeth 82, pinion 68 is drivably connected through the synchronizer hub to shaft 50. Similarly, when the sleeve engages teeth 84, pinion 70 is drivably connected to shaft 50. The sleeves of the synchronizers are moved by the vehicle operator by selecting manually the various gear ratios.

A first gear arrangement includes a second speed ratio pinion 86 and a fourth speed ratio pinion 88, journalled on the outer surface of sleeve shaft 20, in continuous meshing engagement, respectively, with second speed output gear 90 and fourth speed output gear 92. A first synchronizer clutch 94, mounted on shaft 20 and located between these pinions, includes a hub 96 splined to shaft 20, a sleeve 98 fitted within a spline on the outer surface of the hub and movable axially into engagement with dog teeth 100, 102, which are fixed to the pinions. When sleeve 98 is moved forward into engagement with teeth 100, pinion 86 is drivably connected to shaft 20. When sleeve 98 is moved rearward into engagement with teeth 102, pinion 88 is drivably connected to shaft 20.

A countershaft 104 is rotatably mounted on the transmission casing at bearings 106, 108 for rotation parallel to the axis of input shaft 14 and sleeve shafts 20, 50.

Output gears 72, 74, 90, 92 are fixed to the countershaft by splines located at its outer surface. An output shaft 110 is aligned with the axis of the countershaft, supported rotatably on the transmission casing by a bearing 112, and seated within a pocket bearing 114 formed in the rear face of the countershaft. Journalled on the outer surface of the output shaft are reverse output gear 116, and low range output gear 118 which are in continuous meshing engagement, respectively, with reverse and low range output pinions 120, 122 supported on the input shaft 14. Dog teeth 124, 126 are located for engagement with the internal spline teeth formed on sleeve 128 of the range box coupler 130. The sleeve is moved parallel to the axis of the output shaft when the vehicle operator selects low range operation or reverse range operation. When sleeve 128 moves forward to engage dog teeth 124, reverse output gear 116 is connected to the output shaft. When sleeve 128 moves rearward to engage dog teeth 126, low range output gear 126 is connected to the output shaft.

A second coupler 132 also located in the range box includes a coupler sleeve 134 carried on an external spline formed at the end of countershaft 104. Sleeve 134 can be moved rearward, from its neutral position shown in FIG. 2, into engagement with dog teeth 136 that are fixed to the output shaft 110. When the vehicle operator selects the high range of operation, sleeve 134 is moved rearward through operation of the range selector into engagement with teeth 136, whereby countershaft 104 is drivably connected to the output shaft 110.

The countershaft includes a gear 138, in continuous meshing engagement with pinion 140 formed integrally with the cluster gear wheel 142, with which output pinions 120 and 122 also are formed.

A reverse idler gear is continuously engaged with reverse pinion 120 and reverse gear 116 so that the direction of rotation of the output shaft is reversed when sleeve 128 is moved forward to connect the reverse gear to the output shaft.

The torque delivery path through the range box when the low range is selected includes countershaft 104, pinion 138, gear 140, pinion 122, gear 118, dog teeth 126, coupler sleeve 128 and output shaft 110. The torque delivery path when the high range is selected includes countershaft 104, coupler sleeve 134, dog teeth 136 and output shaft 110.

When reverse drive operation is selected, sleeve 134 of coupler 132 is moved forward out of engagement with dog teeth 136 and the sleeve 128 of coupler 130 is moved forward into engagement with dog teeth 124. The torque delivery path for the reverse drive includes countershaft 104, pinion 138, gear 140, pinion 120, the reverse idler, reverse output gear 116, and output shaft 110.

The transmission produces eight forward speed ratios, the four gear ratios of the first and second gearing means further reduced by the low range gear set, and the four gear ratios directly connected to the output shaft when the high range is selected. In addition, the transmission produces four reverse drive ratios, i.e., the four ratios of the first and second gear sets reduced by the reverse drive output ratio.

Having described a preferred embodiment of our invention, what we claim and desire to secure by U.S. Letters Patents is:

1. A transmission for producing multiple speed ratios comprising:
   an input shaft adapted to be connected continually to a countershaft, and an output shaft;
   first gearing means including multiple pairs of meshing gears and pinions carried on the first shaft and on the countershaft for producing multiple speeds of the countershaft in relation to the speed of the first shaft;
   second gearing means including multiple pairs of meshing gears and pinions carried on the second shaft and the countershaft for producing multiple speeds of the countershaft in relation to the speed of the input shaft;
   first clutch means for selectively driveably connecting the input shaft to the first shaft;
   second clutch means for selectively driveably connecting the input shaft to the second shaft;
   friction clutch means for connecting and disconnecting the power source to the first shaft;
   first synchronizer clutch means for driveably connecting the gear-pinion pairs of the first gearing means selectively to the first shaft;
   second synchronizer clutch means for driveably connecting the gear-pinion pairs of the second gearing means selectively to the second shaft;
   third gearing means including multiple gear-pinion pairs supported on the output shaft and on the input shaft, having one pair supported on the input shaft and the countershaft; and
   coupler means for driveably connecting the gear-pinion pairs of the third gearing means selectively to the output shaft.

2. The transmission of claim 1 wherein the third gearing means further includes:

reverse driving gearing means carried on the input shaft and countershaft for reversing the direction of rotation of the countershaft from its forward drive direction of rotation; and wherein the coupler means includes forward-reverse coupler means for driveably connecting selectively the reverse drive gearing means to the output shaft and a gear-pinion pair of the third gearing means to the output shaft.

3. The transmission of claim 1 wherein the first gearing means includes a second speed ratio gear-pinion pair and a fourth speed ratio gear-pinion pair, one member of each pair being located on an opposite side of the first synchronizer clutch means, and the second gearing means includes a first speed ratio gear-pinion pair and a third speed ratio gear-pinion pair, one member of each pair being located on an opposite side of the second synchronizer clutch means.

4. The transmission of claim 1 wherein the first gearing means includes a second speed ratio gear-pinion pair and a fourth speed ratio gear-pinion pair, one member of each pair being located on an opposite side of the first synchronizer clutch means.

5. The transmission of claim 1 wherein the second gearing means includes a first speed ratio gear-pinion pair and a third speed ratio gear-pinion pair, one member of each pair being located on an opposite side of the second synchronizer clutch means.

6. The transmission of claim 1 wherein the third gearing means includes:

a first pinion fixed to the countershaft;

a cluster gear wheel rotatably supported on the input shaft including a gear meshing with the first pinion, said gear and pinion producing a speed reduction of the cluster gear in relation to the speed of the countershaft, a reverse drive pinion, and a low range forward drive pinion;

a low range forward drive gear rotatably supported on the output shaft meshing with the low range forward drive pinion; and a reverse output gear rotatably supported on the output shaft meshing with the reverse drive pinion.

7. The transmission of claim 1 wherein the third gearing means includes:

a first pinion fixed to the countershaft;

a cluster gear wheel rotatably supported on the input shaft including a gear meshing with the first pinion, said gear and pinion producing a speed reduction of the cluster gear in relation to the speed of the countershaft, and a low range forward drive pinion; and a low range forward drive gear rotatably supported on the output shaft meshing with the low range forward drive pinion.

8. The transmission of claim 6 wherein the coupler means includes:

first coupler means for driveably connecting the countershaft to the output shaft; and second coupler means for selectively driveably connecting the reverse drive gear and the low range forward drive output gear to the output shaft.

9. The transmission of claim 7 wherein the coupler means includes:

first coupler means for driveably connecting the countershaft to the output shaft; and second coupler means for selectively driveably connecting the low range forward drive output gear to the output shaft.

10. The transmission of claim 3 wherein the third gearing means includes:

a first pinion fixed to the countershaft;

a cluster gear wheel rotatably supported on the input shaft including a gear meshing with the first pinion, said gear and pinion producing a speed reduction of the cluster gear in relation to the speed of the countershaft, a reverse drive pinion, and a low range forward drive pinion;

a low range forward drive gear rotatably supported on the output shaft meshing with the low range forward drive pinion; and a reverse output gear rotatably supported on the output shaft meshing with the reverse drive pinion.

11. The transmission of claim 4 wherein the third gear means includes:

a first pinion fixed to the countershaft;

a cluster gear wheel rotatably supported on the input shaft including a gear meshing with the first pinion, said gear and pinion producing a speed reduction of the cluster gear in relation to the speed of the countershaft, a reverse drive pinion, and a low range forard drive pinion;

a low range forward drive gear rotatably supported on the output shaft meshing with the low range forward drive pinion; and a reverse output gear rotatably supported on the output shaft meshing with the reverse drive pinion.

12. The transmission of claim 5 wherein the third gearing means includes:

a first pinion fixed to the countershaft;

a cluster gear wheel rotatably supported on the input shaft including a gear meshing with the first pinion, said gear and pinion producing a speed reduction of the cluster gear in relation to the speed of the countershaft, a reverse drive pinion, and a low range forward drive pinion;

a low range forward drive gear rotatably supported on the output shaft meshing with the low range forward drive pinion; and a reverse output gear rotatably supported on the output shaft meshing with the reverse drive pinion.

13. The transmission of claim 3 wherein the third gearing means includes:

a first pinion fixed to the countershaft;

a cluster gear wheel rotatably supported on the input shaft including a gear meshing with the first pinion, said gear and pinion producing a speed reduction of the cluster gear in relation to the speed of the countershaft, and a low range forward drive pinion; and a low range forward drive gear rotatably supported on the output shaft meshing with the low range forward drive pinion.

14. The transmission of claim 4 wherein the third gearing means includes:

a first pinion fixed to the countershaft;

a cluster gear wheel rotatably supported on the input shaft including a gear meshing with the first pinion, said gear and pinion producing a speed reduction of the cluster gear in relation to the speed of the countershaft, and a low range forward drive pinion;

a low range forward drive gear rotatably supported on the output shaft meshing with the low range forward drive pinion.

15. The transmission of claim 5 wherein the third gearing means includes:
   a first pinion fixed to the countershaft;
   a cluster gear wheel rotatably supported on the input shaft including a gear meshing with the first pinion, said gear and pinion producing a speed reduction of the cluster gear in relation to the speed of the countershaft, and a low range forward drive pinion; and
   a low range forward drive gear rotatably supported on the output shaft meshing with the low range forward drive pinion.

16. The transmission of claim 8 wherein the first gearing means includes a second speed ratio gear-pinion pair and a fourth speed ratio gear-pinion pair, one member of each pair being located on an opposite side of the first synchronizer clutch means, and the second gearing means includes a first speed ratio gear-pinion pair and a third speed ratio gear-pinion pair, one member of each pair being located on an opposite side of the second synchronizer clutch means.

17. The transmission of claim 8 wherein the first gearing means includes a second speed ratio gear-pinion pair and a fourth speed ratio gear-pinion pair, one member of each pair being located on an opposite side of the first synchronizer clutch means.

18. The transmission of claim 8 wherein the second gearing means includes a first speed ratio gear-pinion pair and a third speed ratio gear-pinion pair, one member of each pair being located on an opposite side of the second synchronizer clutch means.

19. The transmission of claim 9 wherein the first gearing means includes a second speed ratio gear-pinion pair and a fourth speed ratio gear-pinion pair, one member of each pair being located on an opposite side of the first synchronizer clutch means, and the second gearing means includes a first speed ratio gear-pinion pair and a third speed ratio gear-pinion pair, one member of each pair being located on an opposite side of the second synchronizer clutch means.

20. The transmission of claim 9 wherein the first gearing means includes a second speed ratio gear-pinion pair and a fourth speed ratio gear-pinion pair, one member of each pair being located on an opposite side of the first synchronizer clutch means.

21. The transmission of claim 9 wherein the second gearing means includes a first speed ratio gear-pinion pair and a third speed ratio gear-pinion pair, one member of each pair being located on an opposite side of the second synchronizer clutch means.

* * * * *